US007222702B2

(12) United States Patent
Kimura

(10) Patent No.: US 7,222,702 B2
(45) Date of Patent: May 29, 2007

(54) GAS SPRING

(75) Inventor: Seiji Kimura, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 468 days.

(21) Appl. No.: 10/473,829

(22) PCT Filed: Apr. 5, 2002

(86) PCT No.: PCT/JP02/03468

§ 371 (c)(1),
(2), (4) Date: Mar. 3, 2004

(87) PCT Pub. No.: WO02/084141

PCT Pub. Date: Oct. 24, 2002

(65) Prior Publication Data

US 2004/0140599 A1    Jul. 22, 2004

(30) Foreign Application Priority Data

Apr. 11, 2001  (JP)  ............................. 2001-112963

(51) Int. Cl.
*F16F 9/02* (2006.01)
(52) U.S. Cl. ............... 188/322.17; 267/137; 267/64.12
(58) Field of Classification Search ........... 188/322.16, 188/322.17, 322.21, 300; 267/137, 64.11–64.13, 267/69, 70, 71, 72
See application file for complete search history.

(56) References Cited

U.S. PATENT DOCUMENTS 5,553,524 A * 9/1996 Fujita ........................... 83/137
6,318,526 B1 * 11/2001 Kruckemeyer et al. ..... 188/322.17
6,322,059 B1 * 11/2001 Kelm et al. .................. 267/119

FOREIGN PATENT DOCUMENTS

| JP | 35-19301 | 8/1960 |
|---|---|---|
| JP | 54-59571 | 5/1979 |
| JP | 2000-5907 | 1/2000 |
| JP | 2001-87910 | 4/2001 |
| JP | 2001-246507 | 9/2001 |
| JP | 2001-280390 | 10/2001 |
| WO | WO 00/05517 A1 * | 2/2000 |

OTHER PUBLICATIONS

Microfilm of the specification and drawings annexed to the request of Japanese Utility Model Application No. 92791/1973 (Laid-open No. 36992/1975) (Hiroaki Hideyoshi) Apr. 17, 1975, (Family: None).
Microfilm of the specification and drawings annexed to the request of Japanese Utility Model Application No. 107478/1981 (Laid-open No. 12741/1983) (Tokico Ltd.), Jan. 26, 1983, (Family: None).
Microfilm of the specification and drawings annexed to the request of Japanese Utility Model Application No. 62643/1972 (Laid-open No. 19171/1974) (Nissin Electric Co., Ltd.), Feb. 18, 1974, (Family: None).

* cited by examiner

*Primary Examiner*—Xuan Lan Nguyen
(74) *Attorney, Agent, or Firm*—Jordan and Hamburg LLP

(57) ABSTRACT

A gas spring (7) comprises a cylinder main body (20); a rod member (21) slidable to cylinder main body; a gas filled chamber (23) filled with compressed gas and urging the rod member in a first direction; a rod inserting hole (32) inserting the rod member (21); an annular collar (24) slidable on the rod member at a position apart from the rod inserting hole in the second direction opposite to the first direction; an annular groove (24a) on the annular collar which is open toward the second direction; and a lock ring (26) engaging with an annular ring mounting groove (25) on the rod member (21). In assembling, the lock ring (26) is moved in the first direction together with the rod member, to thus engage with the annular groove (24a) on the annular collar, so that the annular collar for stopping the rod member and the lock ring is stopped by an end wall of the cylinder main body.

2 Claims, 7 Drawing Sheets

PRIOR ART

GAS SPRING

TECHNICAL FIELD

The present invention relates to a gas spring and its gas filling method, more particularly, to an improved mechanism for restricting the advancing motion of a rod member.

BACKGROUND OF THE INVENTION

A conventional gas spring for use in various machines is provided with a cylinder main body, a rod member slidably fitted to the cylinder main body, a gas filled chamber inside of the cylinder main body and filled with compressed gas (i.e. nitrogen gas). Compressed gas (pressure is about 7 to 10 MPa), is filled in the gas filled chamber. The rod member is driven to advance by the compressed gas. Here, the gas spring is provided with various mechanisms for restricting the advancing operation of the rod member in such a manner that the rod member cannot advance in excess of a predetermined stroke.

For example, the applicant of the present invention has proposed a gas spring as shown in FIG. 10. The gas spring 100 comprises a cylinder main body 101; a rod member 102 with a cylindrical piston penetrating the cylinder main body 101; a gas filled chamber 103, which is formed between the cylinder main body 101 and the rod member 102 and urges the rod member 102 upward with pressure of compressed gas filled inside; a plurality of pin members 104 disposed symmetrically with each other around an axial center of the rod member 102; and slots 105 which receive pin members 104, so as to restrict the moving range of the rod member 102 with respect to the cylinder main body 101. When the rod member 102 advances upward by a predetermined stroke, each pin member 104 fits to the upper end of the slot 105, thereby restricting the movement of the rod member 102.

In the above-described gas spring, after filling of the compressed gas into the gas filled chamber 103, the rod member 102 is pressed down with respect to the cylinder main body 101, to thus turn the gas filled chamber 103 into a sealed state. Thereafter, it is necessary to securely screw the pin members 104 to a screw hole formed at the rod member 102 in order to restrict the movement of the rod member 102. As a result, the man-hour of a gas filling work is increased. Moreover, there is a possibility that the structure of the gas spring becomes complicated.

An object of the present invention is to constitute a gas spring such that a rod member can be restricted at an upper limit position at the same time when compressed gas is filled into a gas filled chamber, and to simplify a mechanism for restricting the advancing motion of the rod member.

DISCLOSURE OF THE INVENTION

A gas spring according to the present invention is provided with a cylinder main body, a rod member slidably inserted into the cylinder main body, and a gas filled chamber inside of the cylinder main body and filled with compressed gas and applying gas pressure on the rod member so as to urge the rod member in a first direction.

This gas spring further comprises; a rod inserting hole for inserting the rod member which is formed on an end wall of the cylinder main body in a second direction opposite to the first direction; an annular collar slidably fitted around the rod member at a position apart from the rod inserting hole in the second direction, an annular groove formed on the annular collar and being open toward the second direction; and a lock ring engaging with an annular ring mounting groove formed on the rod member; wherein the lock ring is moved in the first direction together with the rod member, to thus engage with the annular groove on the annular collar, so that the annular collar for stopping the rod member and the lock ring is stopped by an end wall of the cylinder main body.

When the rod member is moved in the first direction by gas pressure of the compressed gas in the gas filled chamber in the state in which the lock ring engages with the ring mounting groove of the rod member, the lock ring is moved toward the first direction together with the rod member. When the rod member is moved by a predetermine stroke toward the first direction, the lock ring engages with the annular groove on the annular collar, which receives the rod member and the lock ring and moves toward the first direction. The annular collar is stopped by the end wall of the cylinder main body, thereby restricting the movement of the rod member toward the first direction. Thus, the rod member can be restricted at an upper limit position without any special work after filling of the compressed gas, thus simplifying the compressed gas filling work. Furthermore, only the annular collar fitted around the rod member and the lock ring can restrict the movement of the rod member, thereby simplifying the structure of the gas spring.

Here, it is preferable that the lock ring should be constituted such that its diameter can be reduced via one separated portion. When the lock ring is located apart from the ring mounting groove, the diameter of the lock ring is enlarged, so that the lock ring is fitted around the rod member. In contrast, when the lock ring reaches the position of the ring mounting groove, the diameter of the lock ring is reduced, so that the lock ring securely engages with and is held in the ring mounting groove. Thus, the lock ring cannot disengage from the ring mounting groove.

Furthermore, a gas filling method according to the present invention for filling compressed gas into above described gas spring, comprises the steps of; filling the compressed gas into the gas filled chamber with the use of a gas filling jig; moving the rod member toward the second direction so as to allow the lock ring to engage with the ring mounting groove after filling of the compressed gas; moving the rod member in the first direction by the compressed gas in a state in which the lock ring engages with the ring mounting groove, so as to introduce the lock ring into the annular groove formed on the annular collar; and locking the annular collar on an end wall of the cylinder main body.

When the compressed gas is filled into the gas spring, the gas spring is disposed in the gas filling jig. After the compressed gas is filled into the gas filled chamber in the state in which the lock ring disengages from the ring mounting groove, the rod member is driven in the second direction by drive means such as a fluid pressure cylinder from the outside. When the rod member is moved in the second direction, the ring mounting groove reaches the position of the lock ring, so that the lock ring engages with the ring mounting groove. Next, when urging force by the drive means is released, the rod member is driven in the first direction by the gas pressure of the compressed gas, and then, the lock ring is moved toward the first direction together with the movement of the rod member in the state in which the lock ring engages with the ring mounting groove, so that the lock ring is introduced into the annular groove formed on the annular collar. The annular collar receives the rod member and the lock ring, and thus, is stopped on the end wall of the cylinder main body, so that the rod member can be restricted from being moved in the first direction. Thus, it is possible to restrict the rod member at the upper limit position without any special work after filling of the compressed gas, thereby simplifying the gas filling work.

Here, it is preferable that the gas filling jig is provided with a case main body, an outer cylindrical member to be fitted around a portion on an end side in the first direction of the rod member; a rod containing member containing a portion on an end side in the secondd direction of the rod member; and an inner cylindrical member extending from an end in the first direction of the rod containing member toward the first direction and containing therein the cylinder main body.

When the compressed gas is filled into the gas filled chamber in the gas spring, the outer cylindrical member is fitted around the portion on the end side in the first direction of the rod member, and further, the portion on the end side in the second direction of the rod member is contained in the rod containing member, so that the gas spring is disposed in the gas filling jig by containing the cylinder main body in the inner cylindrical member. Subsequently, the outer cylindrical member is moved toward the first direction, so that the rod member is moved toward the first direction relatively with respect to the cylinder main body, thereby producing a clearance between the rod member and a seal member disposed in the rod inserting hole. Thereafter, a gas filling device disposed outside is connected to a gas filling hole, through which the compressed gas can be filled into the gas filled chamber from the containing chamber via the filling hole.

PREFERRED EMBODIMENT OF THE INVENTION

A description of a preferred embodiment according to the present invention will be given hereinafter. In the present preferred embodiment, the present invention is applied to a tool fixing device for fixing a tool detachably at the tip of a spindle of a machine tool.

Figure 1:
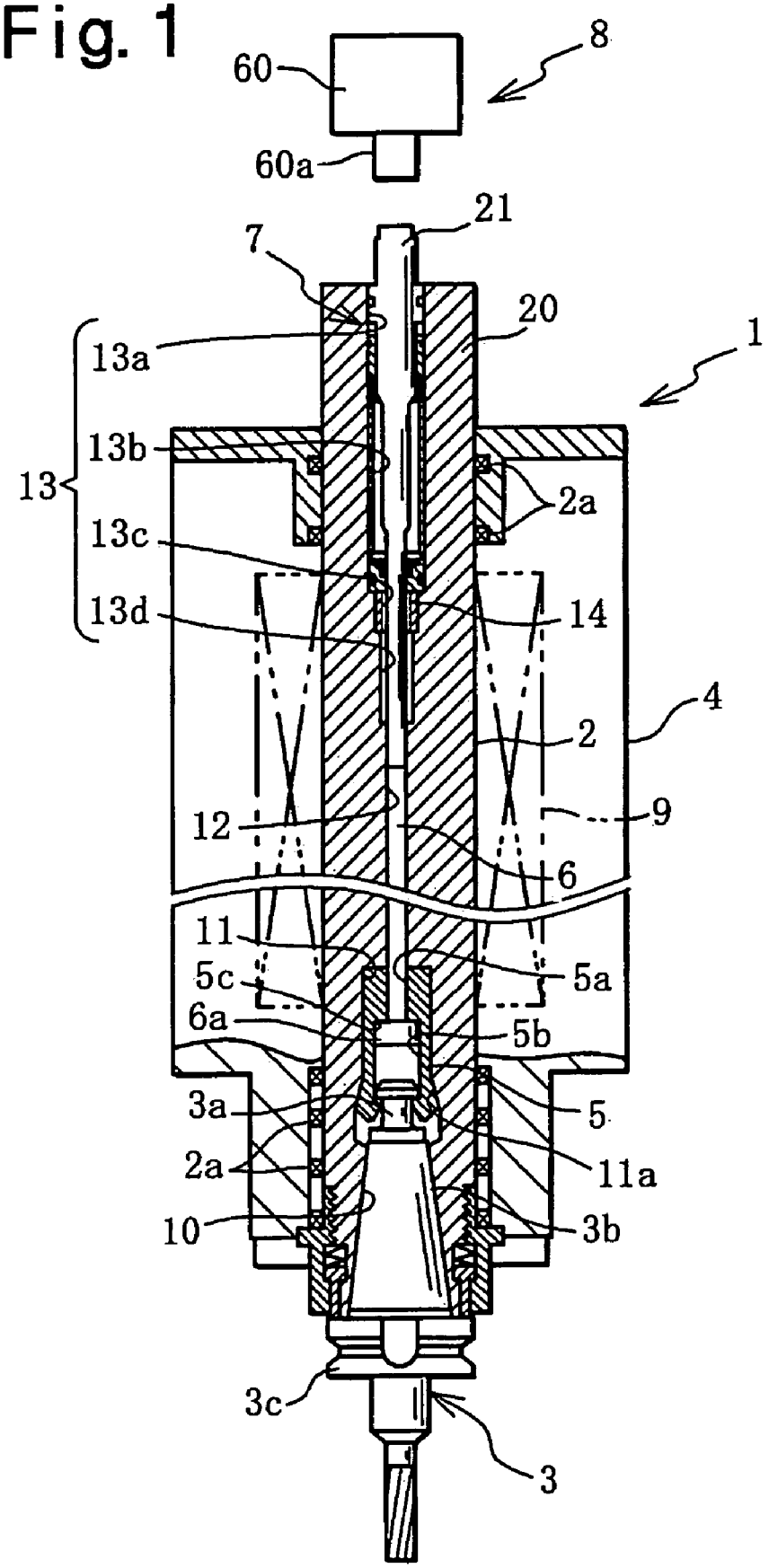
FIG. 1 is a vertically cross-sectional view of a tool fixing device and a gas spring according to a preferred embodiment of the present invention.

As shown in FIG. 1, a spindle 2 of a machine tool is supported rotatably via a plurality of bearings 2a, and a tapered tool holder 10 is formed in the tip of the spindle 2 in such a manner that the diameter of the tool holder 10 is enlarged toward the tip thereof.

A frame 4 supporting the spindle 2 is provided with a tool fixing device 1 and a coil 9 for rotatably driving the spindle 2. The tool fixing device 1 comprises a collet 5 engageable with an engaging portion 3a formed at a base end of a tool 3 in an engageable or disengageable manner; a draw bar 6 in association with the collet 5; a gas spring 7 according to the present invention, connected to the draw bar 6, for urging the draw bar 6 toward the base end (on a tool fixing side, i.e.,upward in FIG. 1); and a fixture releasing mechanism 8 capable of driving the draw bar 6 toward the tip (on a tool fixture releasing side, i.e., downward in FIG. 1) against the urging force of the gas spring 7.

Figure 2:
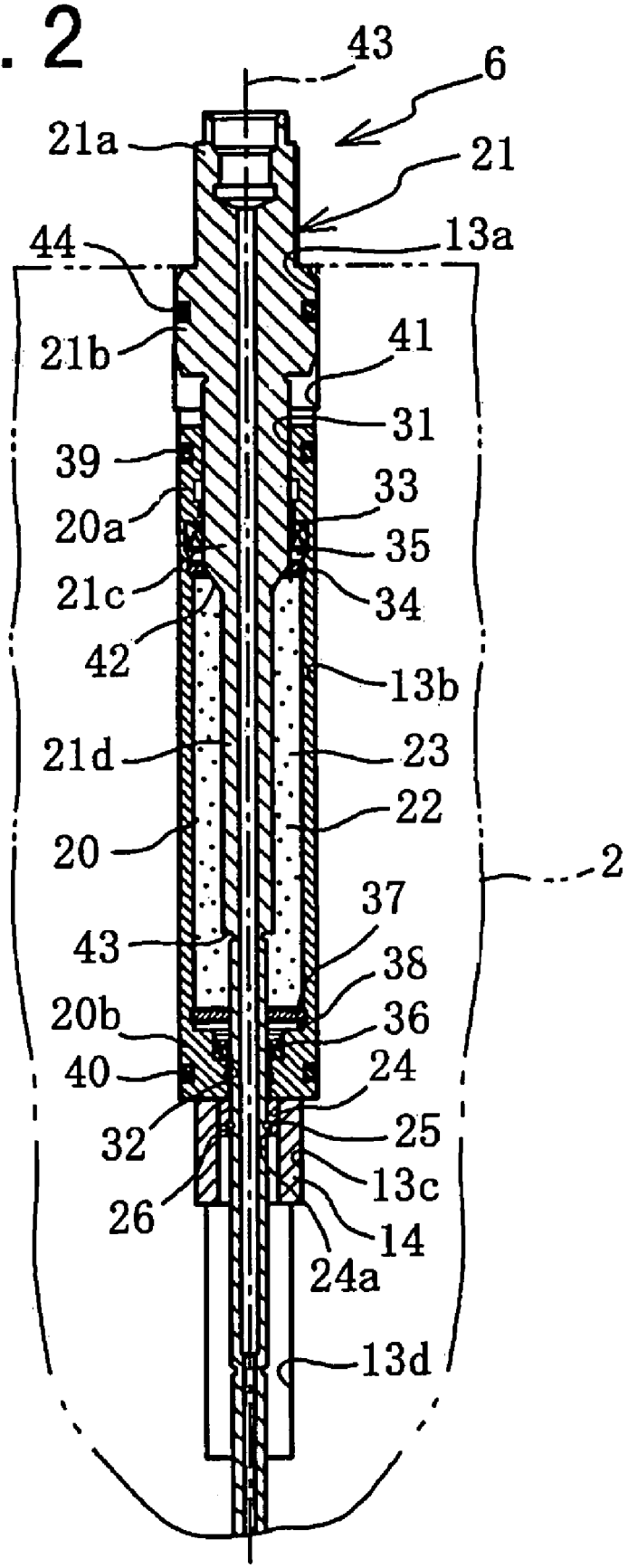
FIG. 2 is a vertically cross-sectional view of the gas spring.

In the spindle 2, the tool holder 10, a housing hole 11 housing the collet 5 therein, an inserting hole 12, into which the draw bar 6 is inserted, and another housing hole 13 housing the gas spring 7 therein are formed in series from the tip toward the base end. At the tip of the housing hole 11 formed is a tapered hole 11a for elastically deforming a chuck of the collet 5 toward a diameter decreasing side. As shown in FIGS. 1, 2, the housing hole 13 consists of a rod sliding hole 13a, into which a large-diameter portion 21b of a rod member 21 is slidably fitted, a cylinder housing hole 13b which diameter is slightly smaller than that of the rod sliding hole 13a and in which a cylinder main body 20 of the gas spring 7 is fitted, a recessed hole 13c continuous to the cylinder housing hole 13b, and a cylindrical hole 13d having a diameter smaller than that of the recessed hole 13c. These holes 13a, 13b, 13c and 13d are arranged in series from the base end. A cylindrical member 14 is fitted into the recessed hole 13c, so that the tip end of the cylinder main body 20 abuts against the base end of the cylindrical member 14.

The tool 3 is provided with the engaging portion 3a, a tapered shaft portion 3b and a large-diameter disk portion 3c disposed at the tip of the tapered shaft portion 3b. The collet 5 has an elastic chuck, which is divided at the tip portion thereof into three or four portions, and includes a shaft hole 5a, into which the draw bar 6 is inserted, and a large-diameter hole 5b continuous with the tip of the shaft hole 5a and has a diameter larger than that of the shaft hole 5a. In the large-diameter hole 5b fitted is a locking portion 6a fixed at the tip of the draw bar 6.

When the draw bar 6 is moved toward the tool fixing side, the locking portion 6a is locked to a step 5c at the boundary between the shaft hole 5a and the large-diameter hole 5b, and further, the collet 5 is moved toward the base end. And then, the draw bar 6 intrudes deeply into the housing hole 11 while the chuck at the tip of the collet 5 is closed by the tapered hole 11a, and on the way, engages with the engaging portion 3a of the tool 3. Thereafter, the engaging portion 3a is pulled toward the base end, so that the tool 3 is fixed in the state in which the tapered shaft portion 3b of the tool 3 abuts strongly against the tool holder 10. When the draw bar 6 is moved toward the fixture releasing side, the locking portion 6a is unlocked from the step 5c. Consequently, the elastic chuck at the tip of the collet 5 also is moved toward the tip while it opens, so that the collet 5 disengages from the engaging portion 3a of the tool 3, thereby releasing the tool 3. In other words, since the draw bar 6 is urged toward the tool fixing side via the engaging shaft portion fixed to the base end of the draw bar 6 by the gas spring 7, the draw bar 6 can be driven from the fixture releasing position to the tool fixing position, and further, the tool 3 can be fixed to the tool holder 10 while the draw bar 6 is held at the tool fixing position. Incidentally, as shown in FIG. 1, the fixture releasing mechanism 8 includes a hydraulic cylinder 60 to be controlled and driven by a drive controller including a hydraulic supply source. The hydraulic cylinder 60 drives the rod member 21 in the gas spring 7 from an advance position to a retreat position, thereby driving the draw bar 6 connected to the rod member 21 toward a fixture releasing side.

Next, explanation will be made on the gas spring 7.

Figure 3:
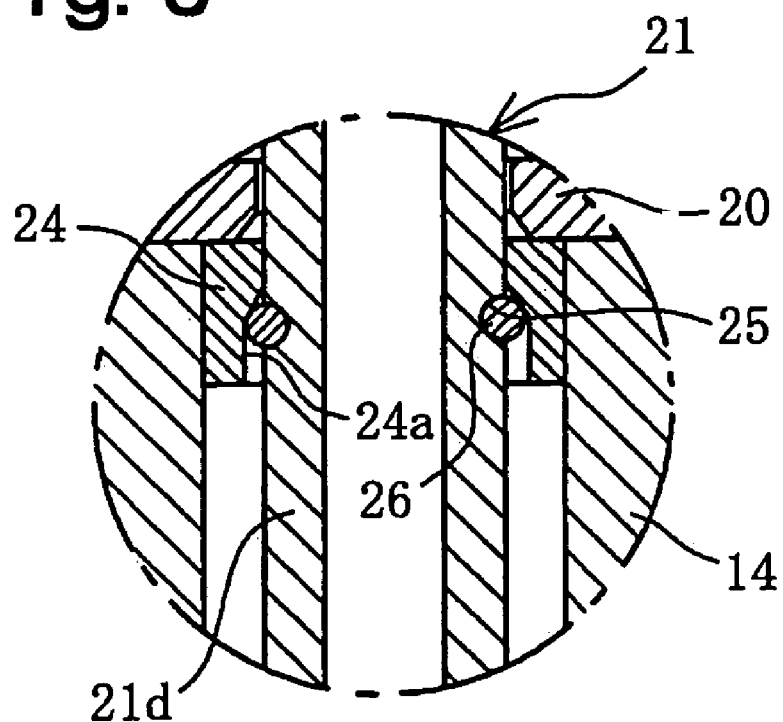
FIG. 3 is an enlarged cross-sectional view showing the vicinity portion of an annular collar (when the gas spring is in a usable state).

As shown in FIGS. 2, 3, the gas spring 7 comprises the cylinder main body 20 fitted into the spindle 2; the rod member 21 slidably inserted into the cylinder main body 20; and a gas filled chamber 23, which is formed inside of the cylinder main body 20 and drives the rod member 21 upward (i.e., a first direction) by the effect of a gas pressure on pressure receiving portions 42,43 of the rod member 21 in the state in which compressed gas 22 is filled. In a portion lower than a rod inserting hole 32 (i.e., a second direction side) in the cylinder main body 20 and at the inner circumference of the cylindrical member 14 disposed is an annular collar 24 slidably fitted around the rod member 21, and further, an annular ring mounting groove 25 is formed on the rod member 21. A lock ring 26 engages with and is held in the ring mounting groove 25.

On end walls 20a and 20b at the upper and lower ends of the cylinder main body 20 formed are rod inserting holes 31 and 32, into which the rod member 21 is inserted, respectively. The gas filled chamber 23 is formed inside of the cylinder main body 20. The gas filled chamber 23 is filled with the compressed gas 22 (i.e., nitrogen gas) of high pressure (7 to 10 MPa) with the use of a gas filling jig 50, described later. At the upper end of the gas filled chamber 23 disposed is a seal member 33 for sealing a clearance between the cylinder main body 20 and the rod member 21. A ring member 34 is disposed on the side of the gas filled chamber 23 in the vicinity of the seal member 33. A grease filled chamber 35 filled with grease is formed between the seal member 33 and the ring member 34. In the same manner, at the lower end of the gas filled chamber 23 disposed are a seal member 36 and a ring member 37, and further, a grease filled chamber 38 is formed between the seal member 36 and the ring member 37. Furthermore, seal members 39 and 40 are disposed between the cylinder main body 20 and the cylinder housing hole 13b.

The rod member 21 is integrally formed with a connecting portion 21a to be connected to an output member 60a of the hydraulic cylinder 60, the large-diameter portion 21b slidably fitted into the rod sliding hole 13a, an intermediate-diameter portion 21c slidably fitted into the rod inserting hole 31, and a rod portion 21d slidably fitted into the rod inserting hole 32 and connected to the draw bar 6 at the lower end thereof in series from above. When the rod member 21 is moved downward by the hydraulic cylinder 60, the large-diameter portion 21b reaches the lower end of the rod sliding hole 13a, and then, is locked at a step 41 formed at the boundary between the rod sliding hole 13a and the cylinder housing hole 13b, and therefore, the rod member 21 can be restricted from being moved further downward. The tapered pressure receiving portion 42 is formed between the intermediate-diameter portion 21c and the rod portion 21d. The pressure receiving portion 43 is formed on the way of the rod portion 21d. The gas pressure of the compressed gas 22 acts on the pressure receiving portions 42, 43, thereby urging the rod member 21 upward. A seal member 44 for sealing a clearance between the spindle 2 and the large-diameter portion 21b is disposed in the large-diameter portion 21b.

Subsequently, a description will be given of the annular collar 24 and the lock ring 26.

Figure 4:
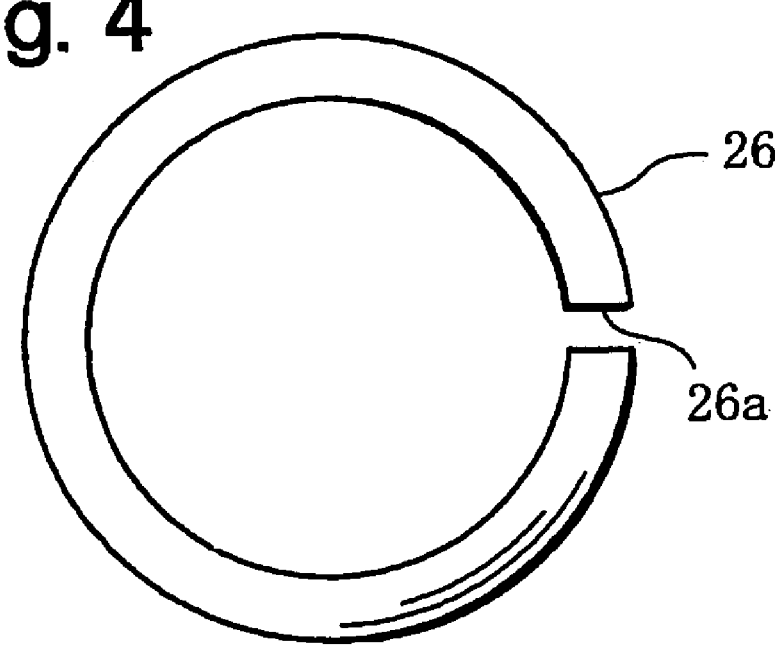
FIG. 4 is an end view showing a lock ring.

As shown in FIGS. 2 and 3, the annular collar 24 is slidably fitted into the cylindrical member 14 in the state fitted around the rod portion 21d of the rod member 21. At the lower end of the annular collar 24 formed is an annular groove 24a which is open toward downward at the lower end thereof. The annular groove 24a is formed at a lower half of the annular collar 24. In the state in which the compressed gas 22 is filled and sealed in the gas spring 7, the lock ring 26 engages with and is held in the ring mounting groove 25 formed at the rod portion 21d of the rod member 21. As shown in FIG. 4, the lock ring 26 is constituted with a separated ring made of steel, and is constituted so that the diameter can be reduced via one separated portion 26a. The lock ring 26 engages with and is held in the ring mounting groove 25 in the state in which the rod member 21 is moved downward. In this state, when the rod member 21 is moved upward by the urging force of the compressed gas 22, the lock ring 26 is moved upward together with the rod member 21. When the rod member 21 is moved by a predetermined stroke, the lock ring 26 engages with the annular groove 24a. The annular collar 24 is moved upward while receiving the rod member 21 and the lock ring 26, to be stopped by the end wall 21b of the cylinder main body 20, thereby restricting the upward movement of the rod member 21.

Figure 5:
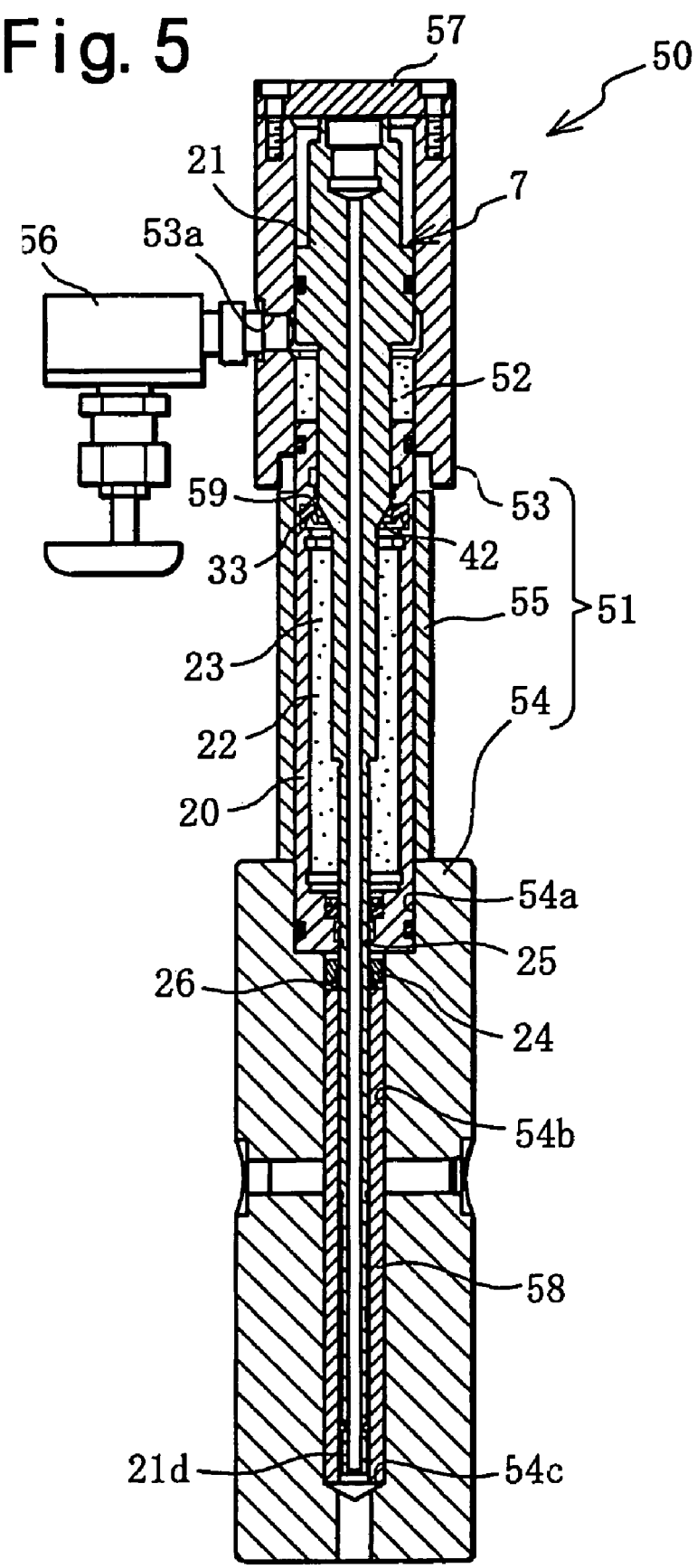
FIG. 5 is a vertically cross-sectional view showing the gas spring (when compressed gas is being filled).
Figure 6:
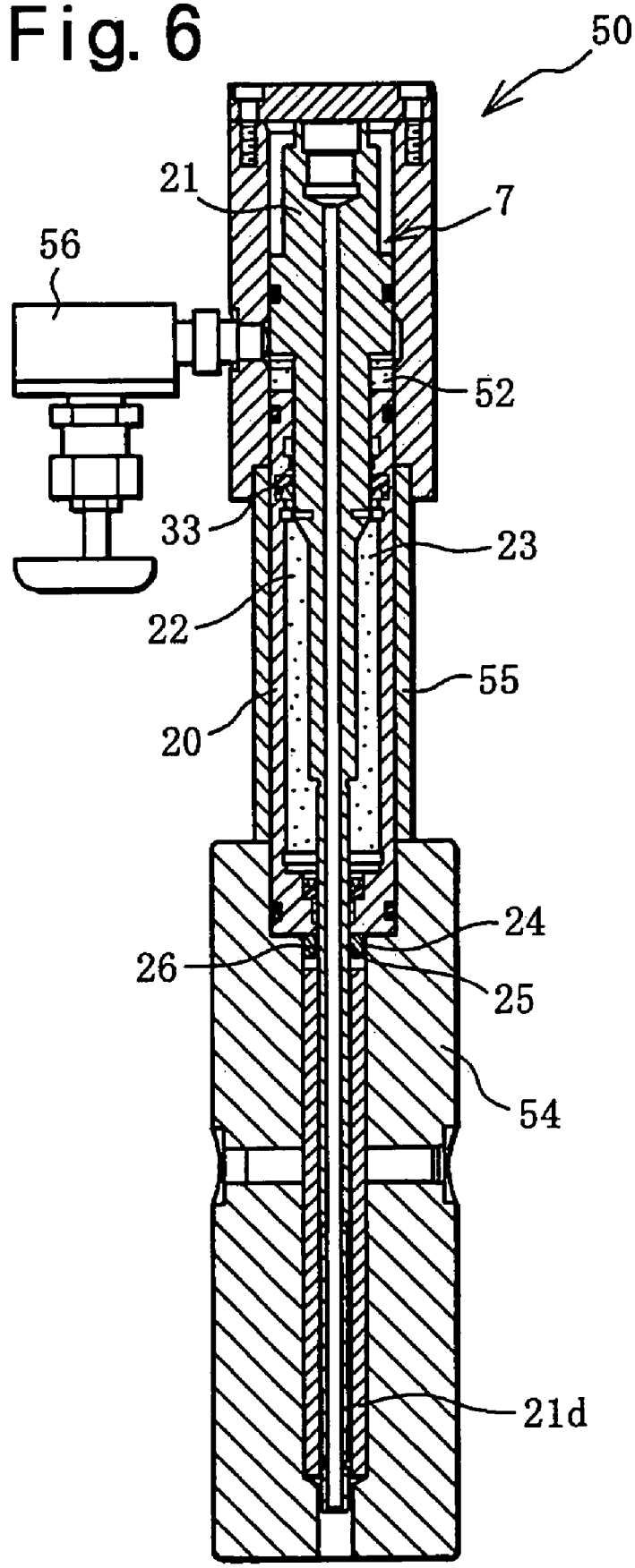
FIG. 6 is a vertically cross-sectional view showing the gas spring (when filling of compressed gas is completed).

Next, explanation will be made on the gas filling jig 50 for filling the compressed gas 22 into the gas spring 7. As shown in FIGS. 5 and 6, the gas filling jig 50 is provided with a case main body 51, a containing chamber 52 which is formed inside of the case main body 51 and contains the gas spring 7 therein, and a gas filling hole 53a which is formed in the case main body 51 and fills the compressed gas 22 into the containing chamber 52. The case main body 51 comprises an outer cylindrical member 53 fitted around the upper end portion of the rod member 21, a rod containing member 54 containing the lower half of the rod member 21, and an inner cylindrical member 55 extending upward from the upper end of the rod containing member 54 and containing the cylinder main body 20 therein. The gas filling hole 53a is formed at the side wall of the outer cylindrical member 53. A closing member 57 is fixed via a bolt at the upper end of the outer cylindrical member 53. The upper end of the rod member 21 abuts against the lower surface of the closing member 57 in the state in which the gas spring 7 is set.

In the rod containing member 54 formed are a containing hole 54a containing the lower end of the cylinder main body 20 therein, and a rod containing hole 54b which is continuous to the lower end of the containing hole 54a and contains the rod portion 21d of the rod member 21. A cylindrical sleeve member 58 is fitted into the rod containing hole 54b. The rod portion 21d is slidably fitted in the sleeve member 58. A stepped portion 54c is formed at the lower end of the rod containing hole 54b, thereby restricting the downward movement of the sleeve member 58 while only the rod portion 21d can be moved vertically.

The cylinder main body 20 is fitted to and contained in the inner cylindrical member 55. The lower end of the outer cylindrical member 53 is slidably fitted at the upper end of the inner cylindrical member 55.

Subsequently, a description will be given of the function of the gas spring 7. First, in order to fill the compressed gas 22 into the gas spring 7, the gas spring 7 is set in the gas filling jig 50. That is to say, the lock ring 26 and the annular collar 24 are disposed at the upper end of the sleeve member 58; the rod portion 21d of the rod member 21 is inserted to the annular collar 24 and the lock ring 26, to be thus disposed inside of the rod containing member 54; and simultaneously, the cylinder main body 20 is fitted in the inner cylindrical member 55. Thereafter, the outer cylindrical member 53 is fitted around the large-diameter portion 21b of the rod member 21.

Figure 7:
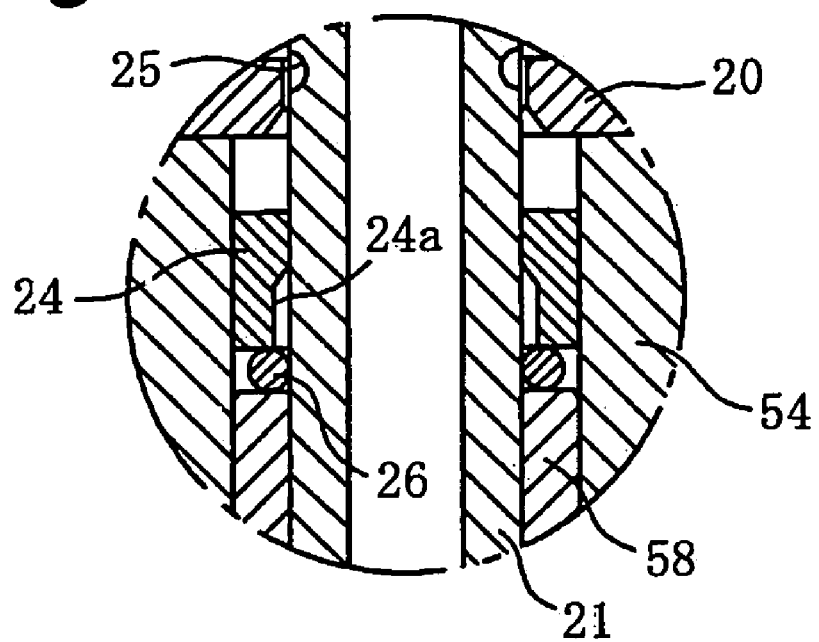
FIG. 7 is an enlarged cross-sectional view showing the vicinity portion of the annular collar (when compressed gas is being filled).

In this state, in order to fill the compressed gas 22 into the gas spring 7, the rod member 21 is moved upward relatively to the cylinder main body 20 such that the seal member 33 is fitted around the rod member 21 at the position of the pressure receiving portion 42, as shown in FIG. 5; a gas filling device 56 is connected to the gas filling hole 53a in the state in which a clearance 59 is generated between the rod member 21 and the seal member 33; and then, the compressed gas 22 is filled into the gas filled chamber 23 from the containing chamber 52 via the clearance 59. At this time, the ring mounting groove 25 is positioned above the annular collar 24, as shown in FIG. 7, and thus, the lock ring 26 fitted around the rod member 21 is enlarged in diameter without any engagement with the ring mounting groove 25.

Figure 8:
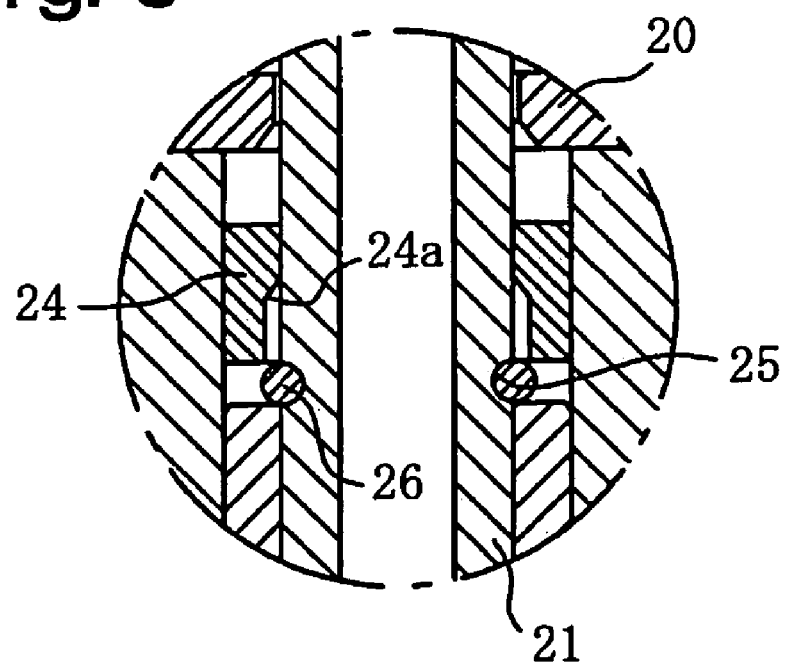
FIG. 8 is an enlarged cross-sectional view showing the vicinity portion of the annular collar (when compressed gas is being sealed).

When the rod member 21 is pressed downward together with the outer cylindrical member 53 by the drive means such as the hydraulic cylinder after the compressed gas 22 is filled into the gas filled chamber 23, the rod member 21 is moved downward so that the seal member 33 is fitted around the intermediate-diameter portion 21c of the rod member 21. In this state, the clearance 59 defined between the rod member 21 and the seal member 33 is eliminated, thereby turning the gas filled chamber 23 into a sealed state. At this time, the ring mounting groove 25 reaches the position of the lock ring 26, as shown in FIG. 8, and thus, the diameter of the lock ring 26 is reduced to engage with the ring mounting groove 25.

Figure 9:
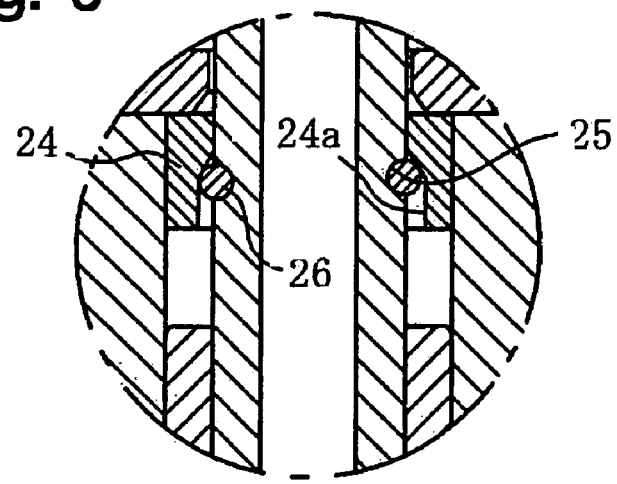
FIG. 9 is a vertically cross-sectional view showing the vicinity portion of the annular collar (when filling of compressed gas is completed).
Figure 10:
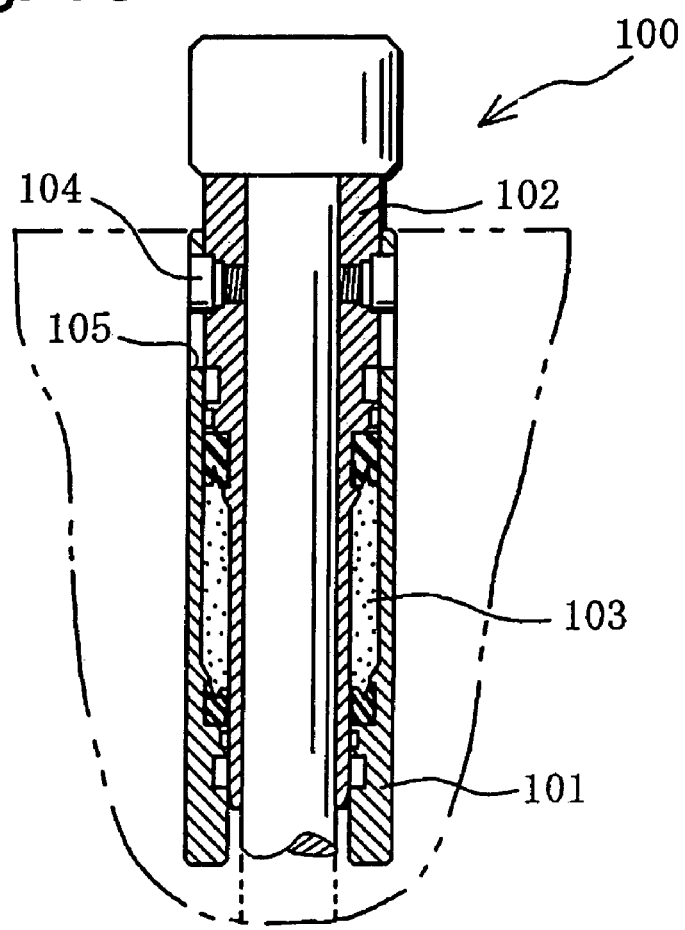
FIG. 10 is a vertically cross-sectional view of a gas spring in the prior art.

In this state, when the urging force by the drive means is released, the rod member 21 advances upward again by the gas pressure of the compressed gas 22, as shown in FIG. 6. However, the lock ring 26 is moved upward integrally with the rod member 21, as shown in FIG. 9. When the rod member 21 is moved upward by a predetermined stroke, the lock ring 26 is introduced into the annular groove 24a, and further, the annular collar 24 is moved upward integrally with the rod member 21, to be thus stopped by the end wall 21b of the lower end of the cylinder main body 20 in abutment, thereby restricting the upward movement of the rod member 21. Thereafter, the gas spring 7 is detached from the gas filling jig 50, thus leading to the completion of the filling work.

As shown in FIG. 2, in the case where the gas spring 7 filled with the compressed gas 22 is disposed in the spindle 2 for use, the rod member 21 is driven upward by the gas pressure of the compressed gas 22 acting on the pressure receiving portions 42 and 43 of the rod member 21 in the state in which the rod member 21 is not driven downward by the hydraulic cylinder 60 in the fixture releasing mechanism 8. At this time, as shown in FIG. 3, the lock ring 26 is moved upward together with the rod member 21 and engages with the annular groove 24a of the annular collar 24 in the state in which the lock ring 26 engages with and is held in the ring mounting groove 25. When the lock ring 26 engages with the annular groove 24a, the annular collar 24 receives the rod member 21 and the lock ring 26, and further, is moved upward together with the rod member 21. When the rod member 21 is moved upward by the predetermined stroke, the annular collar 24 abuts against the end wall 21b of the lower end of the cylinder main body 20, thereby restricting the upward movement of the rod member 21.

When the rod member 21 is moved downward, the rod member 21 is driven downward against the urging force of the gas pressure of the compressed gas 22 by the hydraulic cylinder 60, and thereafter, the lock ring 26 is moved downward together with the rod member 21, thereby releasing the engagement between the lock ring 26 and the annular groove 24a.

With the above-described gas spring 7, the lock ring 26 engages with the annular groove 24a of the annular collar 24, and further, the annular collar 24 is stopped by the end wall 21b of the cylinder main body 20. Consequently, it is possible to securely restrict the upward movement of the rod member 21 via the annular collar 24. Moreover, the lock ring 26 is constituted so as to reduce its diameter via one separated portion 26a, and therefore, the lock ring 26 can securely engage with the ring mounting groove 25 without any failure.

The upward movement of the rod member 21 can be restricted by the lock ring 26 and the annular collar 24 only by releasing the urging force by the drive means after filling of the compressed gas 22, thereby shortening man-hours of the gas filling work, and further simplifying the structure of the gas spring 7.

Incidentally, the structure of the gas filling jig 50 is not limited to the above-described structure. The present invention can be applied to any jig as long as the rod member 21 can be restricted at the upper limit position by the lock ring 26 and the annular collar 24 when the rod member 21 advances or retreats after filling of the compressed gas 22. Additionally, the present invention can be applied to a gas spring provided with a gas filling valve for filling compressed gas without using the gas filling jig 50. Moreover, the present invention can be applied to a gas spring for use in not only the tool fixing device 1 for the spindle 2 but also various machines or devices which necessitate strong urging functions.

The invention claimed is:

1. In a gas filling method for filling compressed gas into a gas spring comprising a cylinder main body; a rod member slidably inserted into said cylinder main body; a gas filled chamber inside of said cylinder main body and filled with compressed gas and applying a gas pressure on said rod member so as to urge said rod member in a first direction; a rod inserting hole for inserting said rod member which is formed on an end wall of said cylinder main body in a second direction opposite to said first direction; an annular collar slidably fitted around said rod member at a position apart from said rod inserting hole in said second direction; an annular groove formed on said annular collar and being open toward said second direction; and a lock ring engaging with an annular ring mounting groove formed on said rod member:

said gas filling method is characterized by comprising steps of:

filling said compressed gas into said gas filled chamber with the use of a gas filling jig;

moving said rod member toward said second direction so as to allow said lock ring to engage with said ring mounting groove after filling of said compressed gas;

moving said rod member in said first direction by said compressed gas in said chamber in a state in which said lock ring engages with said ring mounting groove, so as to introduce said lock ring into said annular groove formed on said annular collar; and locking said annular collar on an end wall of said cylinder main body.

2. A gas filling method according to claim 1, wherein said gas filling jig is provided with a case main body; a containing chamber in said case main body for containing said gas spring; and a gas filling hole formed in said case main body for filling said compressed gas into said containing chamber; said case main body having;

an outer cylindrical member to be fitted around a portion on an end side in said first direction of said rod member;

a rod containing member containing a portion on an end side in said second direction of the rod member; and an inner cylindrical member extending from an end in said first direction of said rod containing member toward said first direction and containing therein said outer cylindrical member.

* * * * *